United States Patent
Jin et al.

(10) Patent No.: US 9,734,620 B2
(45) Date of Patent: Aug. 15, 2017

(54) APPARATUS AND METHOD FOR GRAPHICS STATE MANAGEMENT

(71) Applicant: Samsung Electronics Co., Ltd., Suwon-si (KR)

(72) Inventors: Seung Hun Jin, Suwon-si (KR); Soo Jung Ryu, Hwaseong-si (KR); Yeon Gon Cho, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 189 days.

(21) Appl. No.: 14/682,285

(22) Filed: Apr. 9, 2015

(65) Prior Publication Data
US 2015/0294436 A1 Oct. 15, 2015

(30) Foreign Application Priority Data
Apr. 10, 2014 (KR) .................. 10-2014-0043100

(51) Int. Cl.
*G06T 15/00* (2011.01)
*G06F 12/00* (2006.01)
(52) U.S. Cl.
CPC ............ *G06T 15/005* (2013.01); *G06F 12/00* (2013.01)
(58) Field of Classification Search
None
See application file for complete search history.

(56) References Cited

U.S. PATENT DOCUMENTS

| | | | |
|---|---|---|---|
| 7,404,056 B1 | 7/2008 | Nordquist | |
| 7,404,059 B1 | 7/2008 | Nordquist | |
| 7,593,971 B1 | 9/2009 | Nordquist | |
| 7,673,304 B2 | 3/2010 | Gosalia et al. | |
| 7,681,077 B1 | 3/2010 | Eitzmann et al. | |
| 2006/0161911 A1* | 7/2006 | Barrs | G06F 9/461 717/170 |
| 2008/0208850 A1* | 8/2008 | Boyce | G06F 17/30985 |
| 2009/0021518 A1 | 1/2009 | Harada | |
| 2011/0022817 A1 | 1/2011 | Gaster et al. | |
| 2011/0153957 A1 | 6/2011 | Gao et al. | |
| 2011/0242119 A1 | 10/2011 | Bolz et al. | |

FOREIGN PATENT DOCUMENTS

JP 2009-43245 A 2/2009

* cited by examiner

*Primary Examiner* — Michelle Chin
(74) *Attorney, Agent, or Firm* — Harness, Dickey & Pierce, P.L.C.

(57) ABSTRACT

An apparatus and method for graphics state management. The apparatus for graphics state management includes a state version manager configured to manage changes in graphics state versions by allocating or deallocating a memory for each of graphics states based on a page of a predetermined size, wherein the state version manager allocates or deallocates pages for each of the graphics state versions by using a string of binary values that indicates the respective reference states of each of those pages.

13 Claims, 20 Drawing Sheets

FIG. 3

| STATE ID | HIGHEST-LEVEL PAGE ADDRESS | REFERENCE STATE BIT (N BIT) | | | | | | | | | | |
|---|---|---|---|---|---|---|---|---|---|---|---|---|
| | | 0 | 1 | 2 | 3 | 4 | 5 | 6 | 7 | 8 | ... | n-2 | n-1 |
| k | 0×A0000 | 0 | 0 | 1 | 1 | 1 | 0 | 1 | 1 | 1 | ... | 1 | 1 |
| k+1 | 0×B0000 | 0 | 0 | 1 | 1 | 0 | 1 | 1 | 0 | 0 | ... | 1 | 1 |
| k+2 | 0×C0000 | 0 | 0 | 0 | 0 | 0 | 0 | 0 | 0 | 0 | ... | 0 | 0 |

FIG. 8

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 0 | 0 | 0 | 0 | 0 | 0 | 0 | 0 | 0 | 0 | 0 | 0 | 0 | 0 | 0 |
| | | | | | | | | | | | | | | | | |
| | | | | | | | | | | | | | | | | |
| | | | | | | | | | | | | | | | | |

FIG. 9

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 1 | 1 | 1 | 1 | 1 | 1 | 1 | 1 | 1 | 1 | 1 | 1 | 1 | 1 | 1 | 1 |
| 1 | 0 | 0 | 0 | 0 | 0 | 0 | 0 | 0 | 0 | 0 | 0 | 0 | 0 | 0 | 0 | 0 |
| | | | | | | | | | | | | | | | | |
| | | | | | | | | | | | | | | | | |

FIG. 10

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 1 | 1 | 1 | 1 | 1 | 1 | 1 | 1 | 1 | 1 | 1 | 1 | 1 | 1 | 1 | 1 |
| 1 | 0 | 0 | 0 | 0 | 0 | 0 | 0 | 0 | 0 | 0 | 0 | 0 | 0 | 0 | 0 | 0 |
| | | | | | | | | | | | | | | | | |
| | | | | | | | | | | | | | | | | |

FIG. 11

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 1 | 1 | 1 | 1 | 1 | 1 | 1 | 1 | 1 | 1 | 1 | 1 | 1 | 1 |
| 1 | 0 | 0 | 0 | 0 | 0 | 0 | 0 | 0 | 0 | 0 | 0 | 0 | 0 | 0 | 0 | 0 |
| | | | | | | | | | | | | | | | | |
| | | | | | | | | | | | | | | | | |

FIG. 12

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 1 | 1 | 1 | 1 | 1 | 1 | 1 | 1 | 1 | 1 | 1 | 1 | 1 | 1 |
| 1 | 0 | 0 | 0 | 0 | 0 | 0 | 0 | 0 | 0 | 0 | 0 | 0 | 0 | 0 | 0 | 0 |
| | | | | | | | | | | | | | | | | |
| | | | | | | | | | | | | | | | | |

FIG. 13

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 1 | 1 | 1 | 1 | 1 | 1 | 0 | 1 | 1 | 1 | 1 | 1 | 1 | 1 |
| 1 | 0 | 0 | 0 | 0 | 0 | 0 | 0 | 0 | 0 | 0 | 0 | 0 | 0 | 0 | 0 | 0 |
| | | | | | | | | | | | | | | | | |
| | | | | | | | | | | | | | | | | |

FIG. 14

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 1 | 1 | 1 | 1 | 1 | 1 | 0 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 |
| 2 | 0 | 0 | 0 | 0 | 0 | 0 | 0 | 0 | 0 | 0 | 0 | 0 | 0 | 0 | 0 | 0 |
| | | | | | | | | | | | | | | | | |

FIG. 15

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 1 | 1 | 1 | 1 | 1 | 1 | 0 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 |
| 2 | 0 | 0 | 0 | 0 | 0 | 0 | 0 | 0 | 0 | 0 | 0 | 0 | 0 | 0 | 0 | 0 |
| | | | | | | | | | | | | | | | | |

FIG. 16

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 1 | 1 | 1 | 1 | 1 | 1 | 0 | 1 | 1 | 1 | 1 | 1 | 1 | 1 |
| 1 | 0 | 1 | 1 | 1 | 1 | 1 | 1 | 1 | 1 | 1 | 1 | 1 | 1 | 1 | 1 | 1 |
| 2 | 0 | 0 | 0 | 0 | 0 | 0 | 0 | 0 | 0 | 0 | 0 | 0 | 0 | 0 | 0 | 0 |
| | | | | | | | | | | | | | | | | |

FIG. 17

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 1 | 1 | 1 | 1 | 1 | 1 | 0 | 1 | 1 | 1 | 1 | 1 | 1 | 1 |
| 1 | 0 | 1 | 0 | 1 | 1 | 1 | 1 | 1 | 1 | 1 | 1 | 1 | 1 | 1 | 1 | 1 |
| 2 | 0 | 0 | 0 | 0 | 0 | 0 | 0 | 0 | 0 | 0 | 0 | 0 | 0 | 0 | 0 | 0 |
| | | | | | | | | | | | | | | | | |

FIG. 18

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 1 | 1 | 1 | 1 | 1 | 1 | 0 | 1 | 1 | 1 | 1 | 1 | 1 | 1 |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| | | | | | | | | | | | | | | | | |

FIG. 19

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 1 | 1 | 1 | 1 | 1 | 1 | 0 | 1 | 1 | 1 | 1 | 1 | 1 | 1 |
| 1 | 0 | 0 | 0 | 0 | 0 | 0 | 0 | 0 | 0 | 0 | 0 | 0 | 0 | 0 | 0 | 0 |
| | | | | | | | | | | | | | | | | |
| | | | | | | | | | | | | | | | | |

FIG. 20

| STATE ID | REFERENCE STATE BIT (RSB, 16 BITS) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 1 | 0 | 0 | 0 | 0 | 0 | 0 | 0 | 0 | 0 | 0 | 0 | 0 | 0 | 0 | 0 | 0 |
| | | | | | | | | | | | | | | | | |
| | | | | | | | | | | | | | | | | |
| | | | | | | | | | | | | | | | | |

APPARATUS AND METHOD FOR GRAPHICS STATE MANAGEMENT

CROSS-REFERENCE TO RELATED APPLICATION(S)

This application claims the benefit under 35 USC 119(a) of Korean Patent Application No. 10-2014-0043100, filed on Apr. 10, 2014, in the Korean Intellectual Property Office, the entire disclosure of which is incorporated herein by reference for all purposes.

BACKGROUND

1. Field

The following description relates generally to a technology for graphics state management, and according to an example to a technology for graphics state management in which memory is allocated and deallocated using reference states of memory pages, which correspond to graphics states.

2. Description of Related Art

A modern graphics library such as DirectX or OpenGL (Open Graphics Library) is a big state machine that operates according to graphics states. For example, for one graphics process to perform operations such as a draw call, a sequence of graphics states is required to be maintained simultaneously. The sequence of graphics states is graphics state versions that are created while one graphics state changes gradually. Data of these consecutive graphics state versions do not generally change much, so that when creating a new graphics state version, data of a previous version may be copied or a pointer may be used to refer to overlapping portions of the data.

During one graphics process in which consecutive graphics states are maintained, a specific graphics state version may be created and/or terminated. When a graphics state version is created, pages are allocated in memory or pages of other versions are referenced without allocating pages. Once a graphics state version has been terminated, a page, to which the version has been allocated, is required to be deallocated. However, in a case where the page is referenced in another version, the page may not be deallocated. For this reason, reference states of each page are needed to be managed for allocation and deallocation of memory. Operations of allocation and deallocation of memory, which are required to control changes of graphics states, may affect the entire performance of a system that performs a graphics process. For example, the operations may affect memory and operations associated with reference states of memory pages of graphics states. Accordingly, the performance of an entire system may be improved by minimizing the operations required for graphics state changes. Accordingly, there is a need for a technology that allows efficient operations of checking, increasing, or reducing of reference states of memory pages, which correspond to graphics states.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided is an apparatus and method for graphics state management that allocates and deallocates pages for each of the graphics state versions by using a string of binary values that indicates reference states of each of the pages.

In one general aspect, there is provided an apparatus for graphics state management, the apparatus including a state version manager configured to manage graphics state versions, in which the state version manager allocates or deallocates pages for each of the graphics state versions by using a string of binary values that indicates reference states of each of the pages.

The string of binary values may be a bit string that includes reference state bits (RSBs) that are represented by any one of the binary values to indicate respective reference states of each of the pages.

The total number of RSBs included in the bit string may be identical to a total number of pages of each of the graphics state versions, and one RSB indicates a reference state of a page.

The total number of RSBs included in the bit string may not be identical to a total number of pages of each of the graphics state versions, and one RSB collectively indicates a reference state of a page group including two or more pages.

The bit string may be managed as part of an entry for each of the graphics state versions in a state table managed by the state version manager.

When a command to create a new graphics state version is given, the state version manager may be further configured to allocate an entry for the new graphics state version in the state table; and to allocate pages of the new graphics state version in a memory pool.

When a command to change a specific graphics state version is given, the state version manager may be further configured to identify, in the state table, an RSB value of a page of a higher graphics state version corresponding to an RSB of a page of a current graphics state version to be changed; and may be configured to allocate a new page for the current graphics state version to determine whether to change the version on the new page or on a previous page based on the identified RSB value.

When a command to terminate a specific graphics state version is given, the state version manager may be further configured to identify, in the state table, an RSB value of a page of the current graphics state version to be terminated; may be configured to determine whether to change or to maintain an RSB value of a page of a next higher graphics state version, which corresponds to the identified RSB value based on the identified RSB value; may be configured to deallocate the page only in the case where the identified RSB value is not referenced; and may be configured to remove an entry of the current graphics state version from the state table in the case where all the pages are deallocated.

In another general aspect, there is provided a method for graphics state management, the method including: managing a change in graphics state versions by allocating or deallocating a memory for each of the graphics state versions based on a page of a predetermined size, in which the pages for each of the graphics state versions are allocated or deallocated by using a string of binary values that indicates reference states of each of the pages.

Other features and aspects will be apparent from the following detailed description, the drawings, and the claims.

BRIEF DESCRIPTION OF THE DRAWINGS

FIG. 3 is a schematic diagram illustrating an example of a graphics state table according to another embodiment.

FIGS. 8 to 20 are schematic diagrams explaining creating, changing, and removing of bit string entries in a state table when creating, changing, and terminating graphics states according to an embodiment.

Figure 1:
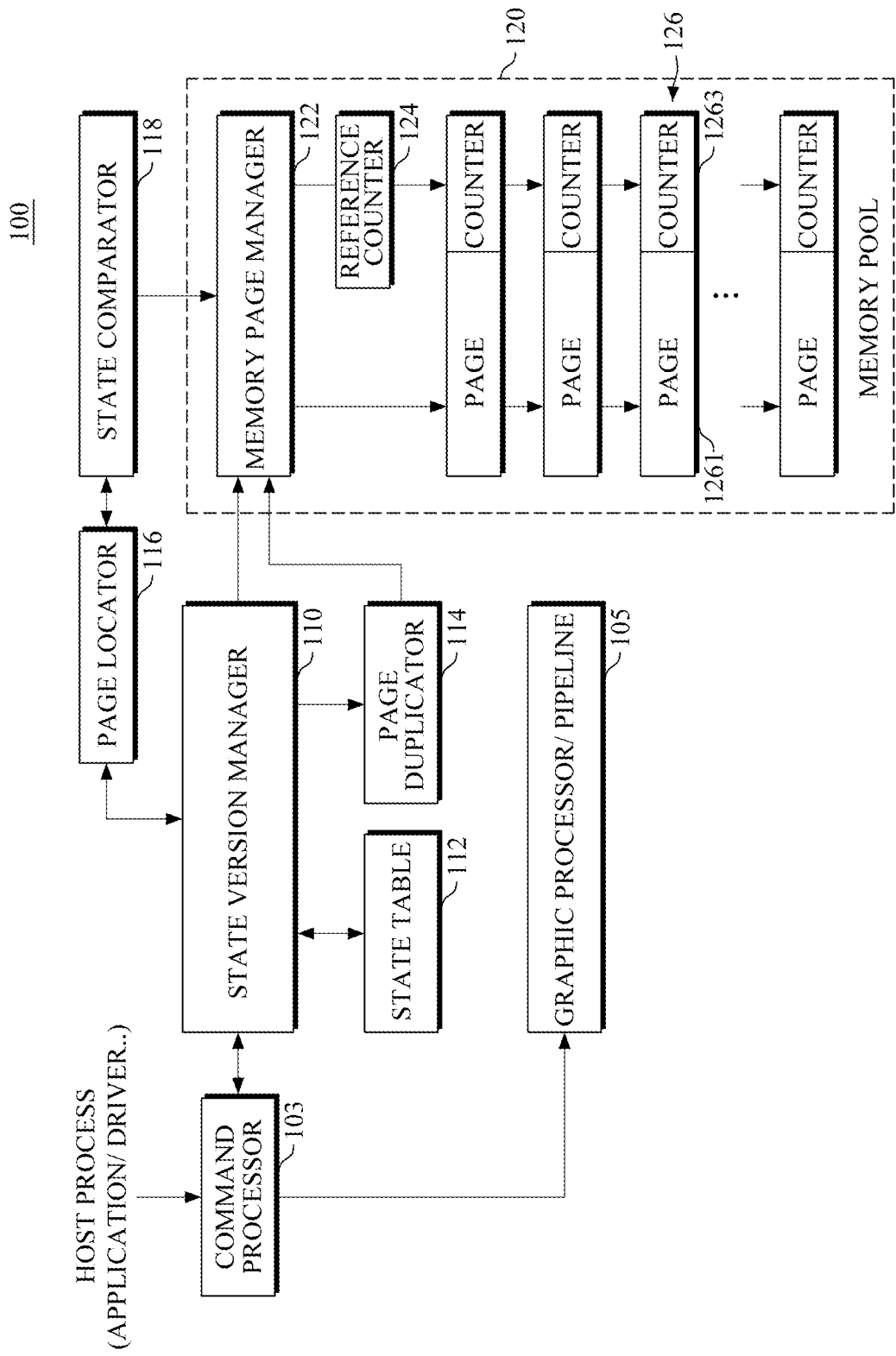
FIG. 1 is a block diagram illustrating an example of a general apparatus for graphics state management.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A graphics library, such as OpenGL and DirectX, is used for the graphics process in various fields, such as graphic-related applications, Computer-Aided Design (CAD), virtual reality, information visualization, flight simulation, computer games, and the like, and such graphics library operates as a type of a state machine. One graphics process may have one or more graphics contexts. Therefore, a system that performs a graphics process is required to maintain one or more graphics states simultaneously. Operations required to process changes in consecutive graphics states that are maintained simultaneously may be a burden on the entire graphics process. As changes in the consecutive graphics states may heavily affect the performance of an entire system, operations required to change graphics states need to be minimized. In addition, management of consecutive graphics states is referred to as state version management, or state versioning.

Generally, graphics states that are maintained simultaneously for one graphics process may be considered graphics state versions that result from gradual and consecutive changes of an initially created graphics state. A graphics state version is generally a structure of sizes ranging from a few kilobytes to scores of kilobytes. In any well written user program, most data portions of consecutive graphics state versions that are maintained simultaneously do not change but remain overlapping. As a result, the overlapping data in different graphics state versions may be referenced by using a pointer. Further, different portions in one graphics state may also have overlapping data, such that overlapping portions in one graphics state may be referenced by using a pointer. A single graphics state is comprised of items, each of which may have a data value of a specific size such as 32 bits or 64 bits. Also, each item may [DXR1] have a pointer instead of a data value, in which case the pointer may refer to a different item that has an identical data value, or may refer to a related component that includes the item.

In the graphics process, memory is required to be allocated and deallocated rapidly as graphics state versions are created and terminated. Accordingly, the memory is divided in advance into blocks of a specific size called pages, and these pages are allocated if necessary. However, as each item of graphics states has a relatively small size, i.e., smaller than 64 bits, memory that is divided into such a small size is a huge burden on a system. Therefore, several graphics state items are generally managed in a page, which is the size of tens to hundreds of bytes. As a result, pages may be in one graphics state, or graphics state items may be included in one page.

FIG. 1 is a block diagram illustrating an example of a general apparatus for graphics state management.

Referring to FIG. 1, the graphics state management apparatus 100, which is a system that manages graphics states by comparing graphics states with a reference counter, includes a command processor 103, a graphics processor/pipeline 105, a state version manager 110, a state table 112, a page duplicator 114, a page locator 116, a state comparator 118, and a memory pool 120. The memory pool 120 includes a memory page manager 122, a reference counter 124, and page blocks 126. Each page block 126 includes a page 1261 and a counter 1263.

The command processor 103 may be, for example, a Graphics Processing Unit (GPU), and receives commands from a host process such as a graphics application or a driver. The host process may transmit commands, such as a draw call or a state change command, to the command processor 103. Upon receiving a command from the host process, the command processor 103 interprets the received command and transmits the command to the state version manager 110. The state version manager 110 manages graphics state versions according to the command interpreted by the command processor 103. The graphics processor/pipeline 105 may perform graphics calculations according to the graphics command.

The state version manager 110 manages graphics state versions stored in the memory pool 120 which may be, for example, a GPU memory. A memory of the memory pool 120 is divided into page blocks 126. The page blocks 126 may be of a specific size. Each page block 126 may include a page 1261 that includes items of graphics state versions and a counter 1263 that indicates a reference count of the page 1261. At the request of the state version manager 110, the memory page manager 122 manages allocation and deallocation of the page blocks, and the reference counter 124 manages an increase and/or decrease of the counter 1263. The page locator 116 may locate, from among pages allocated in the memory pool 120, a specific page that corresponds to a specific item of a specific graphics state version. By comparing graphics states with each other, the state comparator 118 may determine whether a specific page that corresponds to a specific item of a specific graphics state version has been allocated in the memory of the memory pool 120. The state version manager 110 may associate the state table 112 with a state version identifier (ID) and a memory address corresponding to the ID, and may store the associated table. Once a memory page is newly allocated, the page duplicator 114 duplicates a page value corresponding to a previous state version to a newly allocated page by the control of the state version manager 110.

Generally, once a command to change a specific item of a current graphics state version is given, the state version manager 110 checks whether a page corresponding to an item has been allocated in the memory by using the page locator 116 and the state comparator 118. If the page has been allocated in the memory, the state version manager 110 changes the item in the previously allocated page without allocating a new page. By contrast, if the page has not been allocated in the memory, the state version manager 110 controls the memory page manager 122 to allocate a new page in the memory. Thereafter, the state version manager 110 controls the page duplicator 114 to duplicate pages of a current graphics state version in an allocated page, and the state version manager 110 changes the item in duplicated pages. The reference counter 124 increases a reference count of allocated pages that are referenced every time a new graphics state version is created, and also decreases a reference count of the pages that are no longer referenced every time a specific graphics state version is terminated and cancelled. The garbage collector deallocates, at a regular interval, a page having a reference count of 0, and returns the page to a memory pool.

As described above, the general graphics state management apparatus 100 includes a reference counter 124 that is associated with each page to maintain reference states of each page in addition to pages for graphics states in the memory pool 120. Further, when changing a graphics state, the general apparatus 100 refers to a reference counter 124 that is associated with each page and checks the reference counter 124 for the count, so as to check an allocation state of the page. Further, every time a graphics state version is created or terminated, the general apparatus 100 performs calculations to increase or decrease a reference count. The general apparatus 100 separately manages reference counters that indicate reference states of pages for each graphics state. This process may result in an increased burden on a system due to more calculations, and the greater use of memory, for management of graphics states. Therefore, there is a need for a technology that can help save memory as well as reduce calculation burdens.

In the embodiment, in order to save memory as well as to reduce calculation burdens, the apparatus and method for graphics state management provides a technology for graphics state management, which uses a string of binary values that indicate whether pages of each graphics state have been referenced.

Pages may have the following two states: a state where "pages are referenced"; and a state where "pages are not referenced". This can be compared to a case in FIG. 1, in which a reference counter of the general apparatus 100 increases to have a positive integer or decreases to have a minimum value of 0. That is, a reference counter of the general apparatus indicates a reference count (i.e., pages are referenced once, twice, or three times). By contrast, in the embodiment of the present disclosure, the reference counter indicates, for example, only whether pages are referenced, not a specific reference count. In graphics state management, reference states of pages are used for allocation and deallocation of the pages, and as such there is no need to know how many times pages are referenced; also pages may be allocated or deallocated based on whether the pages are referenced (once or more) or whether the pages are not referenced (zero count).

In the embodiment, strings of binary values may be represented as a single bit string that includes elements (i.e. bits) each representing either 0 or 1. A bit that represents 0 may correspond to a page that has never been referenced, while a bit that represents 1 may correspond to a page that has been referenced. By contrast, a bit that represents 0 may correspond to a page that has been referenced, while a bit that represents 1 may correspond to a page that has never been referenced. Such bit string may be a type of bit-vectors. Each bit that constitutes a bit string is referred to as a reference state bit (RSB).

One bit string corresponds to one graphics state version. Once a graphics state version is created, a bit string corresponding thereto may be created. Once a graphics state version is terminated, a bit string corresponding thereto may be deleted.

A number of RSBs included in a bit string is predetermined, and each RSB may be arranged sequentially from the leftmost to the rightmost. The number of pages corresponding to one graphics state version is predetermined, and each of the pages may be ranked in a sequential order from the top to the bottom. There may be various corresponding relations between a total number of RSBs included in a row of bits and a total number of pages included in one graphics state version. One RSB may indicate whether one page is referenced or not. Further, a position of a specific RSB may correspond to a page of a specific ranking in a graphics state version.

In another example, a total number of RSBs included in a row of bits may not be the same as a total number of pages included in one graphics state version. For example, one RSB may correspond to a page group including two or more pages. If the RSB value is 0, all of the pages included in a corresponding page group may not be referenced. By contrast, if the RSB value is 1, at least one page among all pages included in a corresponding page group may be referenced. Each page group may be ranked in a sequential order from the top to the bottom. Accordingly, a position of a specific RSB included in a bit string may correspond to a page of a specific ranking in a graphics state version. For example, each of the page groups corresponding to one graphics state version may include the same number of pages. In another example, each of the page groups corresponding to one graphics state version may include different numbers of pages.

In an embodiment, a bit string is created and each entry of a state table contains this bit string. The entries may be stored, changed or deleted in the state table. Each entry in the state table may contain: a value corresponding to a graphics state version; an identifier of a specific graphics state version; an absolute or relative address of a position in a memory where a topmost page of a specific graphics state version is located; and a bit string that indicates reference states of pages corresponding to a graphics state version.

According to a modified embodiment, a bit string contained in the state table may be a compressed bit string.

In the method for graphics state management, a new graphics state may be created in such a manner that once an entry for a new state is allocated in a state table, pages are allocated for the new state in a memory pool, and items of top-level pages are duplicated on the allocated memory pages.

If a command to change a specific item of a current graphics state version is given, a page that includes the item to be changed is detected. Once the page that includes the item to be changed is detected, the page may be identified whether an RSB value corresponding to a page of a higher graphics state version is 0 or 1 with respect to an RSB corresponding to the detected page. An RSB value of 0 indicates that a higher version page has not been referenced (i.e., a page of the current version has been allocated in the memory). Therefore, the value of an item to be changed may be changed in a previously allocated page. By contrast, an RSB value of 1 indicates that a higher version page has been referenced (i.e., a page of the current version has not been allocated in the memory). By allocating a new page and duplicating a page of a higher version, the value of an item to be changed may be changed in the duplicated page.

An entry that contains a new bit string is created in a state table every time a new graphics state version is created. Creating, changing, and deleting RSB values in a bit string will be described in further detail with reference to FIGS. 8 to 20 below.

Once a graphics state version is terminated, pages corresponding to the aforementioned graphics state version are required to be deallocated. To this end, it may be identified whether an RSB value in a bit string of a current graphics state version is 0 or 1. If an RSB value of a specific page of a current graphics state version is 0, this indicates that a specific page of a current graphics state version is not referenced. Accordingly, this page should be deallocated, and as such, an RSB of a page corresponding to a version immediately higher than the current version (i.e., an RSB of a page corresponding to the next higher version), is set to be 0. If an RSB value of a specific page of the current version is 1, this indicates that a specific page of the current version or a page corresponding to the next higher version is referenced by a page corresponding to a lower version. If such is the case, the RSB of a page corresponding to the next higher version is maintained without change. Accordingly, in the case where an RSB of the current version is 0, a page of the RSB is returned to a memory pool, whereas in the case where an RSB of a current version is 1, a page of the RSB is maintained. If all RSBs of a current version are 0, and all the pages have been returned, entries of the current version are deleted from a state table, thereby terminating a current graphics state version.

In the method for graphics state management briefly described above and to be described in further detail with reference to drawings below, state version management, such as allocation and deallocation of each page, is performed by using bit strings that represent a reference state of pages corresponding to graphics state versions. By using the method, operations performed in the apparatus and memory use of the apparatus required for the state version management may be greatly reduced.

In the embodiment, complicated calculations, such as reading reference counters and comparing states every time each graphics state is changed, are not required in state version management. The state version management, for example, only requires a simple operation of identifying RSB values in a bit string and changing the values to either 0 or 1. As only a simple bitwise operation is required, there may be less burden on computing resources, and performance of a graphics process system may be improved.

As for memory, it is assumed that in the apparatus 100 for graphics state management in FIG. 1, a reference counter portion 1263 corresponding to each page uses 16 bits; one state version uses 256 pages; and a maximum number of graphics state versions that are maintained at the same time is 2048. Assuming that about 20% of pages change when a graphics state is changed, counters are required in proportion to a number of allocated pages to maintain reference counts for each page in the general system 100. In other words, memory is needed, in which the required memory size is $A=16\times256\times2048\times0.2$ (bits). By contrast, in the method for graphics state management that uses a bit string having a number of RSBs that is the same number as a number of pages, the number of bits that correspond to a number of pages of each state version is required to be the same as a number of state versions. That is, a memory is needed, in which a required memory size is $B=256\times2048$ (bits). In the embodiment, it can be seen that memory size A required for the general state management is 3.2 times the memory size B needed for the state management. However, this embodiment is merely illustrative, and the embodiments of the present example are not limited thereto.

The apparatus and method for graphics states management will be described in detail below with reference to the following drawings.

The apparatus for graphics states management will be described with reference to FIGS. 2 to 4 below. The apparatus for graphics states management may be implemented as an element of a GPU, but this is merely illustrative. It can be understood by one of ordinary skill in the art that other systems in various combinations of elements may also be implemented within the scope of the following claims. Components of the apparatus for graphics states management may be implemented by hardware that includes circuits, each of which performs its functions. Further, components of the apparatus for graphics states management may be implemented by a combination of computer-executable software, firmware, and hardware that enables s a specific task to be performed when executed by a processor of a computing apparatus.

Figure 2:
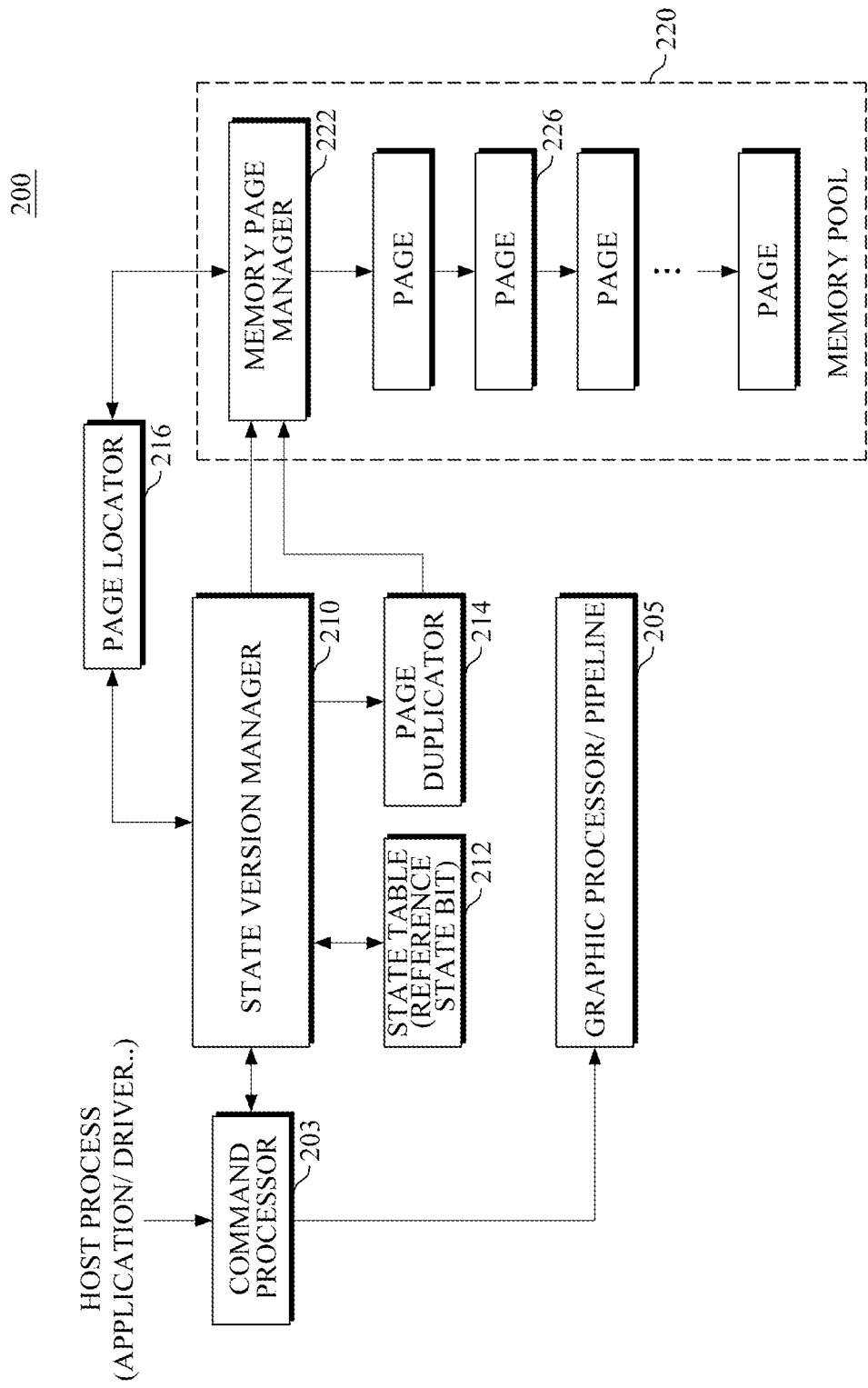
FIG. 2 is a block diagram illustrating an example of an apparatus for graphics state management according to another embodiment.

FIG. 2 is a block diagram illustrating an example of an apparatus for graphics state management according to another embodiment.

Referring to FIG. 2, the apparatus 200 for graphics state management is a system of managing graphics states by using a reference state bit (RSB) managed in a state table. The apparatus 200 includes a command processor 203, a graphics processor/pipeline 205, a state version manager 210, a state table 212, a page duplicator 214, a page locator 216, and a memory pool 220. The memory pool 220 includes pages 226 that are managed by a memory page manager 222. Although FIG. 2 illustrates the command processor 203, the graphics processor/pipeline 205, the state version manager 210, the state table 212, the page duplicator 214, the page locator 216, and the memory pool 220 included in the apparatus 200, one or more of these elements may be embodied as independent hardware. Additionally, the apparatus 200 is not limited to the elements described above and thus the apparatus 200 may include more or less elements.

The command processor 203 may receive a graphics command from a host processor, such as a graphic application or a driver. Upon receiving a graphics command from a host processor, the command processor 203 interprets the received graphics command, and transmits the command to the state version manager 210. According to the received graphics command, the state version manager 210 uses an RSB in the state table 212 to manage graphics state versions in the memory pool 220. The graphics processor/pipeline 205 may perform graphics calculations according to graphics commands.

The state version manager 210 manages graphics state versions that are stored for each page in the memory pool 220. The memory of the memory pool 220 is divided into pages 226, each of which has a specific size. Each page 226 may include one or more items of a graphics state version. The memory page manager 222 manages allocation and deallocation of pages. The page locator 216 may locate the position of a page of a specific item by finding the page number of a graphics state version that the item is on. The page duplicator 214 duplicates an existing page on a new page allocated in the memory pool.

The state table 212 stores a state version identifier (ID), an address of a memory of the state version ID, and entries including a bit string that indicates whether pages of a corresponding state version are referenced. The state table 212 will be described below in further detail with reference to FIG. 3. Pages that are associated with the state table 212 and allocated in the memory pool will be described below in further detail with reference to FIG. 4.

As described above, in the apparatus 200 for graphics states management, a bit string that is represented by binary values indicates whether pages of a graphics state version are referenced or not. Accordingly, allocation or deallocation of pages in a memory may be managed by simple bit operations, thereby saving memory, and simplifying operations.

FIG. 3 is a schematic diagram illustrating an example of a graphics state table according to another embodiment.

Referring to FIG. 3, a state table 300, which corresponds to the state table 212 in FIG. 2, is illustrated. The state table 300 includes entries 310, 320, and 330. Although only three entries are illustrated therein, this illustrative example is a simplified embodiment for a simple explanation. In the embodiment, a total number of entries that may be maintained in the state table 300 may be the same as a total number of graphics state versions that may be maintained by a system at the same time.

Each of the entries 310, 320, and 330 may include a state identification (ID) 301, a highest-level page address 303, and a reference state bit or a bit string 305. The state ID 301 is information to identify each graphics state version. The highest-level page address 303 may include an address of a location in a memory that allows access to the highest-level page among pages of each graphics state version. The highest-level page address 303 may indicate an absolute location or a relative location in a memory. For example, in the case where an address of the highest-level page of a high-level graphics state version is determined to be a base address, and an offset that indicates a distance from the base address is added thereto, the highest-level page address 303 may include only the offset value. Further, the bit string 305 includes reference state bits (RSBs) that indicate whether pages of each graphics state version are referenced or not by using binary values.

The length of the bit string 305 is determined according to a total number of RSBs and a total number of pages of a graphics state version. In the embodiment, an RSB value is either 0 or 1, in which 0 indicates that a page has not been referenced, and 1 indicates that a page has been referenced. In other words, if an RSB value is 0, there are no pages of other graphics state versions that reference pages of the corresponding graphics state version, while if an RSB value is 1, pages of other graphics state versions reference pages of the corresponding graphics state version.

As a bit string includes a number of RSBs that is the same as a total number of pages, if the size of one graphics state version is 8 kilobytes, and the size of a page is 128 bytes, 64 RSBs (=8,000 bytes/128 bytes) in total are required to indicate whether each page is referenced. In the case where one RSB of a bit string indicates collectively whether several pages are referenced, the length of a bit string may be shortened. A shortened bit string enables a smaller size of the entire state table 300, thereby saving more memory.

Further, according to a modified embodiment, most RSBs of a bit string are more likely to be 1 than 0, thereby improving compression efficiency. In the case where a bit string is compressed to be stored in a state table, the length of a bit string that indicates whether each page is referenced may be further shortened. In order to determine the presence of any changes to the graphics state, a compressed bit string may be decompressed to identify the RSB values.

Figure 4:
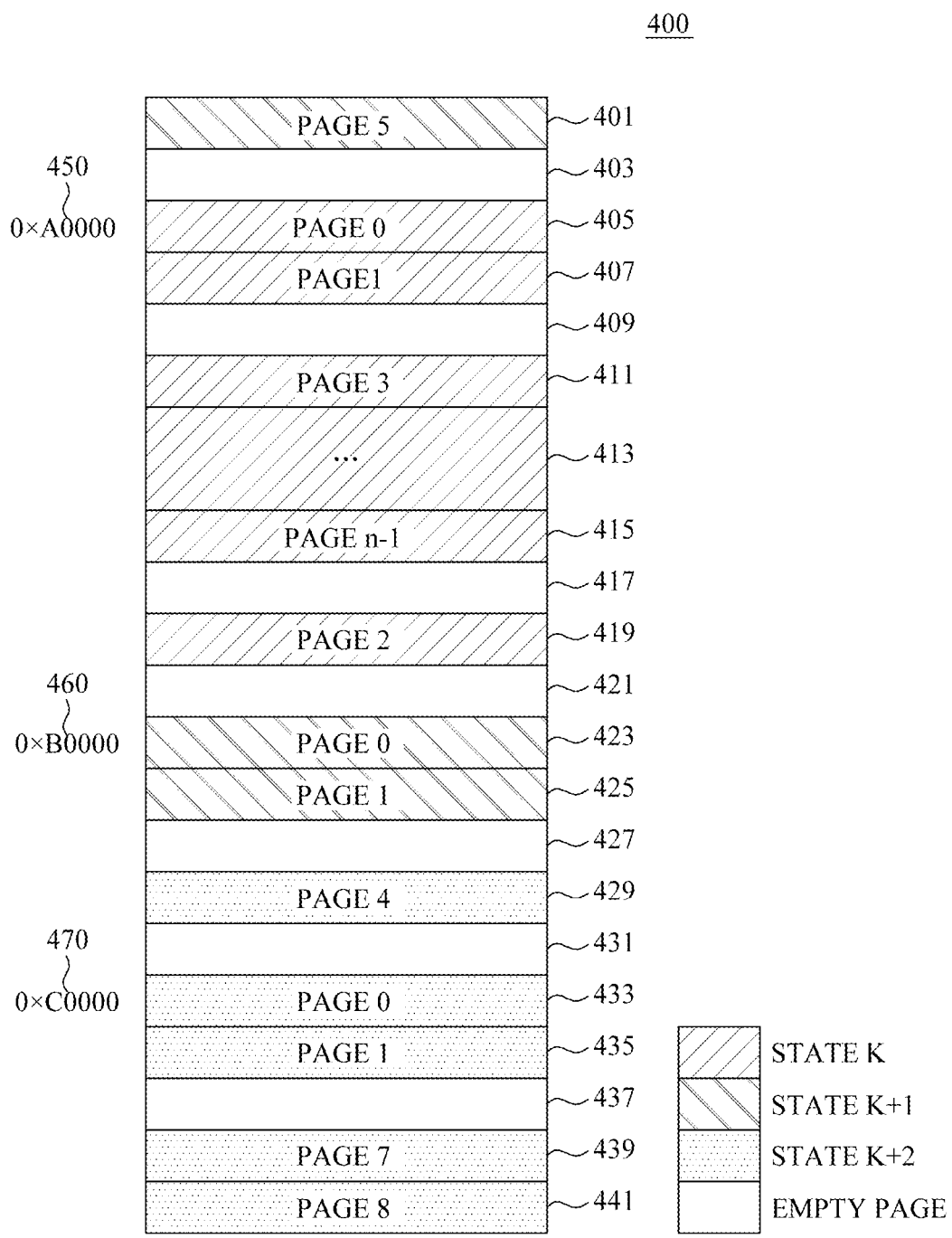
FIG. 4 is a schematic diagram illustrating an example of a state in which graphics state pages are allocated in a memory pool according to another embodiment.

FIG. 4 is a schematic diagram illustrating an example of a state in which graphics state pages are allocated in a memory pool according to another embodiment.

Referring to FIG. 4, a page of a memory pool 400 that corresponds to the memory pool 220 in FIG. 2 is illustrated. In the illustrative embodiment, there are pages of three graphics state versions k, k+1, and k+2, in which highest-level pages are allocated in the memory of the memory pool 400 at specific addresses 450, 460, and 470.

In the k version, n number of pages are all allocated, which are indicated as page 0 405, page 1 407, page 2 419, and pages 3 to n-1 411, 413, and 415. Whether pages of the k version are allocated is indicated as either 0 or 1 by n number of RSBs. In the bit string 305, 0-th RSB, a first RSB, and a fifth RSB are indicated as 0, and the rest of the RSBs are indicated as 1. The 0-th RSB, first RSB, and fifth RSB respectively indicate whether page 0, page 1, and page 5 are referenced. Accordingly, it can be seen that page 0, page 1, and page 5 of the k version are not referenced by page 0, page 1, and page 5 of other versions.

All of the n number of pages of the k+1 version are not allocated as can be seen in FIG. 4. In FIG. 4, for example, only page 0 423, page 1 425, page 5 401 are allocated. Whether pages of the k+1 version are referenced is indicated as either 0 or 1 by n number of RSBs of the entry 320 in FIG. 3. The 0-th RSB, first RSB, fourth RSB, seventh RSB, and eighth RSB are indicated as 0, and the rest of RSBs are indicated as 1. The 0-th RSB, first RSB, fourth RSB, seventh RSB, and eighth RSB respectively indicate whether page 0, page 1, page 4, page 7, and page 8 are referenced. Accordingly, it can be seen that page 0, page 1, page 4, page 7, and page 8 of the k+1 version are not referenced by page 0, page 1, page 4, page 7, and page 8 of other versions.

As for the k+2 version, for example, only page 0 433, page 1 435, page 4 429, page 7 439, and page 8 441 are allocated among n number of pages. Whether pages of the k+2 version are referenced is identified as either 0 or 1 by n number of RSBs of the entry 330 in FIG. 3. As the k+2 version is the lowest-level version, all RSBs have a value of 0. Accordingly, it can be seen that pages 0 to n-1 of the k+2 version are not referenced by pages 0 to n-1 of other versions.

As each page that stores a graphics state version in a memory is allocated in a memory pool, each page is not necessarily allocated in a continuous space as illustrated in FIG. 4. In the embodiment, empty pages 403, 409, 417, 421, 427, 431 and 437 are spread across between consecutive pages. The empty pages are not used for any graphics state version. It can also be seen that pages of each graphics state version are not arranged consecutively in physical memory.

As described above, in the apparatus for graphics states management according to the embodiments, whether pages of each graphics state version are referenced may be indicated by a bit string. In this manner, graphics state versions may be managed based on a simple bit operation, thereby enabling efficient management of graphics state versions without any burden on system performance.

The method for graphics state management will be described below with reference to FIGS. 5 to 20. The method is merely illustrative, and it can be understood by one of ordinary skill in the art that other methods in various combinations may also be implemented within the scope of the following claims. All or a part of the method for graphics state management may be coded with computer-executable instructions, modules, software data, algorithms, procedures, plugins, and the like, that enable them to perform specific tasks when executed by a processor of a computing apparatus. Computer-executable instructions and the like are coded by software developers in a programming language, such as BASIC, FORTRAN, C, or C++, and the like, and are compiled in a machine language.

Figure 5:
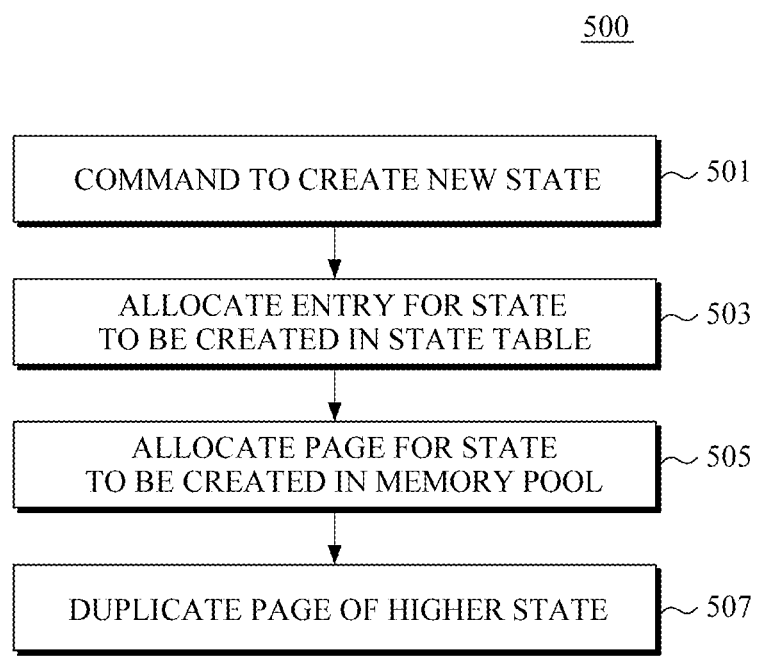
FIG. 5 is a schematic flowchart illustrating an example of creating graphics states according to an embodiment.

FIG. 5 is a schematic flowchart illustrating an example of creating graphics states.

Referring to FIG. 5, creating a graphics state 500 may be started as soon as a graphics command is transmitted to a command processor of a graphics apparatus such as a GPU from an application program or a driver which is executed in a host such as a CPU. The graphics command may include a draw call or a graphics state change command.

In operation 501, the case where a graphics command received by a command processor is interpreted as a command to create a new state is one in which a graphics state change command is received for the first time after a system operation or after a draw call. In order to create a new graphics state according to this command, the state version manager allocates an entry for a new graphics state to be created in a state table in operation 503. Then, the state version manager requests the memory page manager to allocate pages for a graphics state to be created in a memory pool, and the memory page manager allocates requested pages in operation 505. When pages are allocated for a graphics state to be created, for example, only the highest-level page may be allocated without having to allocate all the pages at once. Subsequently, the state version manager may control the page duplicator to duplicate pages of a higher graphics state onto (an) allocated page(s) in operation 507.

Among many graphics states that are maintained at the same time, the higher graphics states may be a version of previous graphics state versions immediately prior to a version of a newly created graphics state. If the newly created graphics state is a first version thereof, duplicating of pages in operation 507 may be replaced with creating of new data values. However, the creating of new data values is not within the scope of the present example, and accordingly, creation of a graphics state 500 relates to creating a new graphics state version in the case where there are previous versions of graphics state(s).

In another embodiment, in the case of a draw call, it is apparent that a graphics state is changed for the next draw call, such that creating of a new graphics state 500 may be performed after every draw call.

Figure 6:
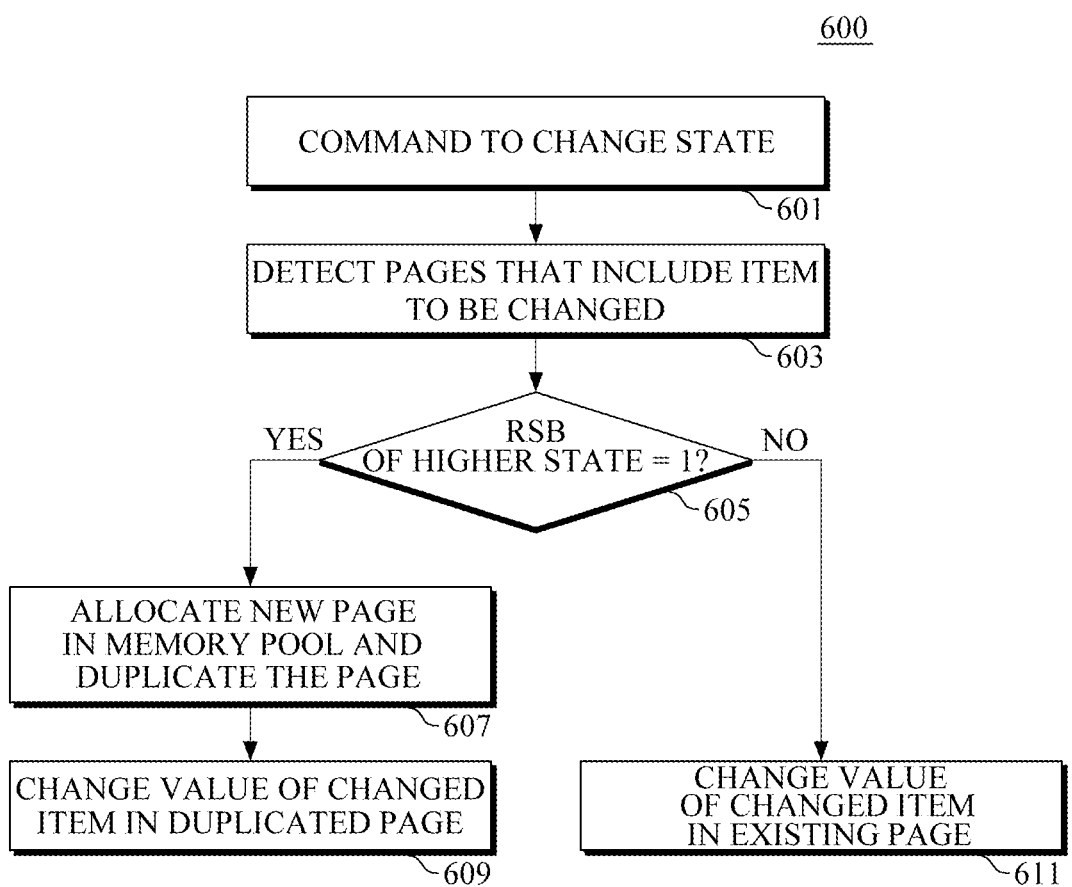
FIG. 6 is a schematic flowchart illustrating an example of changing graphics states according to an embodiment.

FIG. 6 is a schematic flowchart illustrating an example of changing graphics states.

Referring to FIG. 6, changing a graphics state 600 starts with a graphics state change command transmitted to a command processor of a graphics processing apparatus from an application or a driver that is executed in a host. Changing of a graphics state is not related to creating a new graphics state, but to updating one or more items of the existing graphics states.

A graphics state change command may be received from a command processor by a state version manager in operation 601. The command processor may transmit, to the state version manager, factors associated with performing commands along with the state change command. The state version manager may detect pages that include items to be changed by using a page locator in operation 603. Once structures of graphics states are determined, the page locator may detect identification information (e.g. page number) of pages of specific items based on pre-stored data.

Upon detecting pages, the state version manager may read RSBs indicative of whether pages of a current state detected in a state table and pages of other states related to the current state pages are referenced or not. Among the RSBs, it may checked whether an RSB of pages of a higher state than the current state is either 0 or 1 in operation 605. The pages of a higher state refer to the pages arranged in sequence corresponding to the sequence of current state pages out of all the pages of graphics state versions higher than graphics state version of the current state pages.

For example, if a page of a current state is a page corresponding to a third RSB among pages of the k+2 version graphics state in FIG. 3, a page of a higher state is a page corresponding to a third RSB among pages of the k+1 version graphics state. A page of a lower state than the current state may also be defined in a similar manner. Among pages of a higher state, a state of pages corresponding to a state version immediately prior to pages of the current state may be indicated as pages of a next higher state.

In the checking of whether the RSB of the pages of the higher state in operation 605, if the RSB of pages of a higher state is 1 (Yes in operation 605), this indicates that pages of the higher state are referenced by pages of the current state or pages of a lower state than the current state. In other words, pages of the current state, for example, only reference pages of a higher state, but the pages are not allocated in a memory pool. As pages that include items to be changed from a current graphics state version do not actually exist in a memory pool, it is required to create a page to perform a state change command.

Accordingly, a new page is allocated in a memory pool and reference pages of a higher state are duplicated by a page duplicator in operation 607. Subsequently in operation 609, values of the items are changed in pages created in operation 607, such that a state change command received in operation 601 may be performed.

If the RSB of pages of a higher state is 0 (No in operation 605), this indicates that the pages of a higher state are not referenced. In other words, pages of a current state has already been created in a memory pool. Therefore, without any need for allocation of a new page, values of items may be changed in the existing pages in operation 611, such that a state change command received in operation 601 may be performed.

Figure 7:
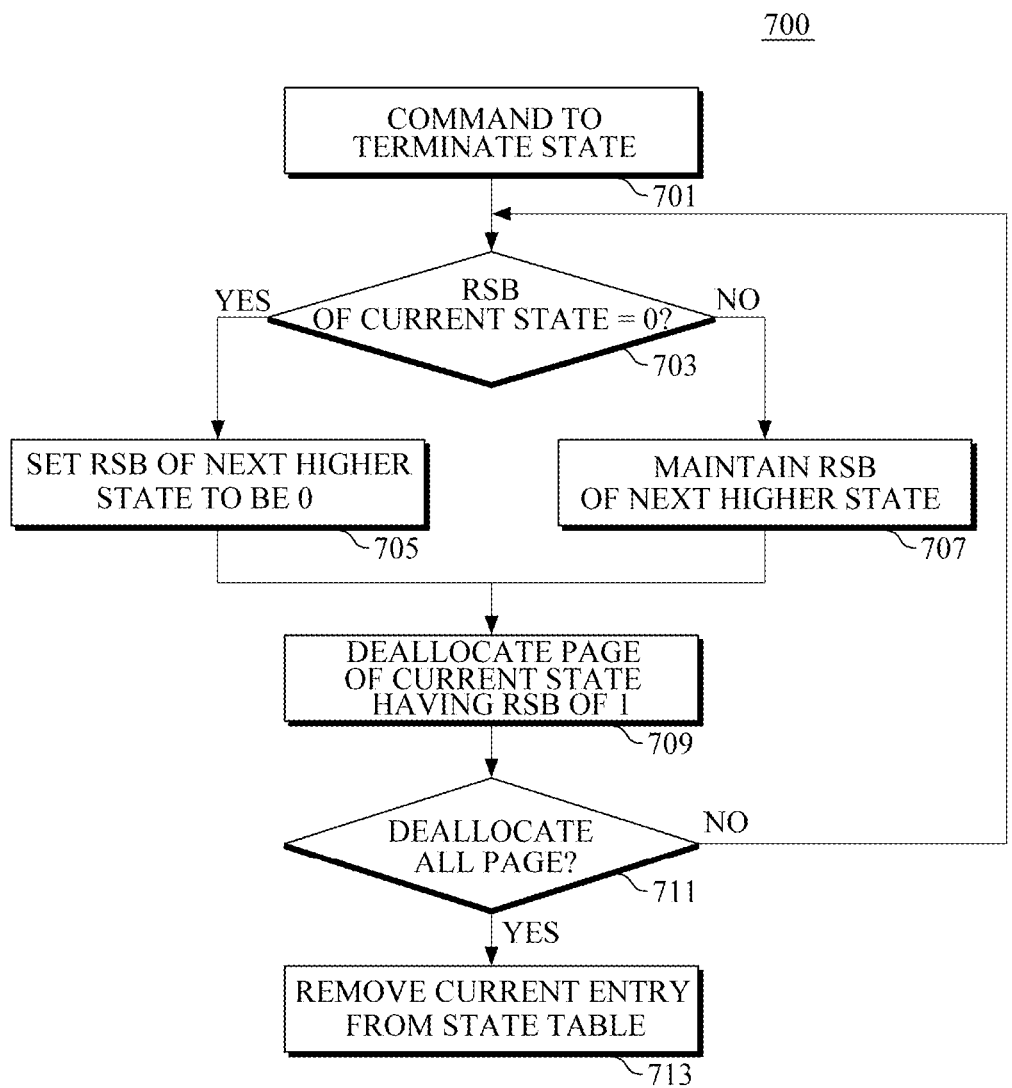
FIG. 7 is a schematic flowchart illustrating an example of terminating graphics states according to an embodiment.

FIG. 7 is a schematic flowchart illustrating an example of terminating graphics states.

Referring to FIG. 7, terminating a graphics state 700 is performed, for example, in the case where a specific graphics state version is no longer used after a draw call that uses the specific graphics state version is complete. A deallocation is performed in which all the pages used to store the specific graphics state version in a memory are returned to a memory pool. However, if all the pages of a specific graphics state version are deallocated in any case, pages of other graphics state versions that have been referenced will be also deallocated, creating a problem when deallocated pages of other graphics state versions are to be referenced. Accordingly, when a graphics state is deallocated, it should be taken into consideration whether each page is referenced or not.

First, a state termination command to terminate a specific graphics state version may be received in operation 701 from a command processor by a state version manager as the specific graphics state version is ended. Then, the state version manager may read RSBs in operation 703 that indicate whether pages of a current graphics state version (i.e. pages of the current state) that are to be deallocated in a state table have been referenced as described above with reference to FIGS. 3 and 4.

If the RSB of the pages of the current state is 0 (Yes in operation 703), this indicates that pages of a lower state than a current state do not reference pages of a current state or pages of a next higher state. In other words, pages of a current state may be deallocated without any problems. Therefore, a state version table considers that the pages of a current state are deallocated, and sets an RSB of the pages of the next higher state with respect to the pages of the current state to be 0 in operation 705.

If the RSB of the pages of the current state is 1 (No in operation 703), this indicates that pages of a lower state than the current state do not reference pages of the current state or pages of the next higher state. Accordingly, since it is required to succeed such reference state even after pages of the current state are deallocated, the RSB of the pages of the next higher state remain without being changed in operation 707.

After operation 705 and operation 707, pages of the current state having an RSB of 0 are deallocated and returned to a memory pool in operation 709, while pages of the current state having an RSB of 1 remain without being deallocated. If all the pages of a current graphics state version are deallocated (Yes in operation 711), entries of the current graphics state version are removed from a state table at operation 713, so that a state termination command received in operation 701 is complete. However, if there are pages that remain without being deallocated (No in operation 711) among all the pages of the current graphics state version, the state termination command is put on hold until all of these pages are deallocated first.

FIGS. 8 to 20 are schematic diagrams explaining creating, changing, and removing of bit strings of entries in a state table when creating, changing, and terminating graphics states according to an embodiment.

Referring to FIG. 8, a state table is illustrated in which one graphics state is created. A state table 800 includes a state ID 801 and reference state bit or a bit string 803 that includes 16 RSBs. The state table 800 includes an entry 810 for a graphics state version of "state 0". RSBs 0 to 15 are all 0, since any one of the 16 pages of the current "state 0" is not referenced by other pages.

Referring to FIG. 9, a state table is illustrated in which an entry 820 for a new graphics state version of "state 1" is added to the embodiment in FIG. 8. Pages of "state 1" are created by duplicating pages of "state 0", such that all the RSBs of "state 0" are 1.

Referring to FIG. 10, a state table is illustrated to explain an example of changing page 0 of state 1 in FIG. 9. A state version manager checks RSBs of state 0 which is a higher state than state 1. In state 0, which is a higher state than the current state of state 1, a page of a higher state corresponding to page 0 of state 1, which is a page of the current state to be changed, is page 0 of state 0. As an RSB 0 corresponding to page 0 of state 0 is 1, page 0 of state 1, which is a page of a current state, references page 0 of state 0, which is a page of a higher state. A state is changed by allocating a new page, so that page 0 of state 1 may point to a new page.

As a result, the state table 800 may be changed as illustrated in FIG. 11. As a result of the state change in FIG. 10, page 0 of state 0 is no longer referenced by page 0 of state 1, such that an RSB 0 corresponding to page 0 of state 0 is set to be 0, as illustrated in FIG. 11.

Referring to FIG. 12, a state table is illustrated to explain an example of changing page 0 of state 1 in FIG. 11. A state version manager checks an RSB of state 0, which is a higher state than state 1. In state 0 which is a higher state than state 1, a page of a higher state corresponding to page 0 of state 1, which is a page of the current state to be changed, is page 0 of state 0. As an RSB 0 corresponding to page 0 of state 0 is 0, it is indicated that page 0 of state 1, which is a page of a current state, does not reference page 0 of state 0, which is a page of a higher state. Accordingly, since a page is already allocated, a state item is changed without allocation of pages.

Referring to FIG. 13, a command identical to those illustrated in FIGS. 10, 11, and 12 is requested with respect to page 8 of state 1, and a result obtained by performing the same process as in FIGS. 10, 11, and 12 is illustrated.

Referring to FIG. 14, subsequent to FIG. 13, a draw call is given, and then a new graphics state version of "state 2" is created, such that an entry 830 corresponding to state 2 is newly allocated. As state 2 is created by duplicating pages of state 1, all the RSBs of state 1 are set to be 1.

Referring to FIG. 15, subsequent to FIG. 14, a state change command is created with respect to page 0 of state 2, as illustrated in FIG. 10. Similarly to FIG. 10, an RSB 0 is 1, which corresponds to page 0 of state 1 that is a page of a higher state than page 0 of state 2, and as such, a new page is allocated and duplicated, and an RSB 0 of state 1 is set to be 0. The result is illustrated in FIG. 16.

Referring to FIG. 17, subsequent to FIG. 16, a state change command is created with respect to page 2 of state 2, as illustrated in FIG. 10, and the result is illustrated in FIG. 17. In FIG. 16, an RSB 2 is 1, which corresponds to page 2 of state 1 that is a page of a higher state than page 2 of state 2, and as such, a new page is allocated and duplicated, and an RSB 2 of state 1 is no longer referenced, and thus is set to be 0. However, an RSB 2 of state 0 is still referenced by page 2 of state 1, and thus remains to be 1.

Referring to FIG. 18, subsequent to FIG. 17, a reference command to reference state 2 has been terminated and thus state 2 is deallocated. All the pages of state 2 that have an RSB of 0 are no longer referenced, such that the pages are returned to a memory pool. As state 2 does not reference a higher state (i.e., state 1), RSBs of state 1, which is a state higher than all the pages of state 2 having an RSB of 0, are set to be 0 (if RSBs of pages of state 2 is 1, the pages may be referenced by a next higher state, and thus an RSB value corresponding to state 2 is not changed).

Referring to FIG. 19, subsequent to FIG. 18, after all the pages of state 2 are returned to a memory pool, the entry 830 for state 2 is removed from a state table.

Referring to FIG. 20, subsequent to FIG. 19, all the pages of state 0 are returned in response to a command to terminate state 0, and then the entry for state 0 is removed from a state table. A first entry 810 was initially allocated to state 0, but state 0 has been deleted, so the first entry 810 belongs to state 1. It can be understood that all the pages of state 1 may be returned to a memory pool any time, as these pages are no longer referenced.

As described above, in the graphics state management system according to the embodiments, graphics state versions may be managed based on a simple bit operation using bit strings that indicate whether pages constituting graphics state versions are referenced.

The apparatus and method for graphics state management may reduce memory and calculations required for the state management in such a manner that a memory is allocated and deallocated by using a string of binary values that indicates reference states of each page of graphics states.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for graphics state management, the apparatus comprising:
    a state version manager configured to manage graphics state versions,
    wherein the state version manager allocates or deallocates pages for each of the graphics state versions by using a string of binary values that indicates reference states of each of the pages,
    wherein the string of binary values is a bit string that includes reference state bits (RSBs) that are represented by any one of the binary values to indicate the respective reference states of each of the pages,
    wherein the bit string is managed as part of an entry for each of the graphics state versions in a state table managed by the state version manager, and
    wherein when a command to change a specific graphics state version is given, the state version manager is further configured to identify, in the state table, an RSB value of a page of a higher graphics state version corresponding to an RSB of a page of a current graphics state version to be changed; and to allocate a new page for the current graphics state version to determine whether to change the version on the new page or on a previous page based on the identified RSB value.

2. The apparatus of claim 1, wherein a total number of RSBs included in the bit string is identical to a total number of pages of each of the graphics state versions, and one RSB indicates a reference state of a page.

3. The apparatus of claim 1, wherein a total number of RSBs included in the bit string is not identical to a total number of pages of each of the graphics state versions, and one RSB collectively indicates a reference state of a page group including two or more pages.

4. The apparatus of claim 1, wherein when a command to create a new graphics state version is given, the state version manager is further configured to allocate an entry for the new graphics state version in the state table; and to allocate pages of the new graphics state version in a memory pool.

5. A method for graphics state management, the method comprising:
    managing a change in graphics state versions,
    wherein pages for each of the graphics state versions are allocated or deallocated by using a string of binary values that indicates reference states of each of the pages
    wherein the string of binary values is a bit string that includes reference state bits RSBs) that are represented by any one of the binary values to indicate the respective reference states of each of the pages,
    wherein the bit string is managed as part of an entry for each of the graphics state versions in a state table, and
    wherein when a command to change a specific graphics state version is given, identifying, in the state table, an RSB value of a page of a higher graphics state version corresponding to an RSB of a page of a current graphics state version to be changed; and allocating a new page for the current graphics state version to determine whether to change the version on the new page or on a previous page based on the identified RSB value.

6. The method of claim 5, wherein a total number of RSBs included in the bit string is identical to a total number of pages of each of the graphics state versions, and one RSB indicates a reference state of a page.

7. The method of claim 5, wherein a total number of RSBs included in the bit string is not identical to a total number of pages of each of the graphics state versions, and one RSB collectively indicates a reference state of a page group including two or more pages.

8. The method of claim 5, wherein when a command to create a new graphics state version is given, allocating an entry for the new graphics state version in the state table; and allocating pages of the new graphics state version in a memory pool.

9. The method of claim 5, wherein when a command to terminate a specific graphics state version is given, identifying, in the state table, an RSB value of a page of the current graphics state version to be terminated; determining whether to change or to maintain an RSB value of a page of a next higher graphics state version, which corresponds to the identified RSB value based on the identified RSB value; deallocating the page only in the case where the identified RSB value is not referenced; and removing an entry of the current graphics state version from the state table in the case where all the pages are deallocated.

10. A graphics state management apparatus comprising:
a state version manager configured to allocate or deallocate pages for each of graphics state versions based on a string of binary values that indicates reference states of each of the pages,
wherein the reference states of each of the pages includes a state indicating that the page is referenced and a state indicating that the page is not referenced,
wherein the string of binary values is a bit string that includes reference state bits (RSBs) that are represented by any one of the binary values to indicate the respective reference states of each of the pages,
wherein the bit string is managed as part of an entry for each of the graphics state versions in a state table managed by the state version manager, and
wherein when a command to change a specific graphics state version is given, the state version manager is further configured to identify, in the state table, an RSB value of a page of a higher graphics state version corresponding to an RSB of a page of a current graphics state version to be changed; and to allocate a new page for the current graphics state version to determine whether to change the version on the new page or on a previous page based on the identified RSB value.

11. The apparatus of claim 10, further comprising a memory page manager configured to manage the allocation and deallocation of the pages for each of the graphics state versions.

12. The apparatus of claim 10, wherein the state table is configured to store a state version identifier (ID), an address of a memory of the state version ID, and entries including a bit string that indicated whether pages of a corresponding state version as referenced.

13. The apparatus of claim 12, wherein the state table includes entries and a total number of entries maintained in the state table is the same as a total number of graphics state versions maintained in the apparatus.

* * * * *